United States Patent [19]

Hassan

[11] Patent Number: 5,689,606
[45] Date of Patent: Nov. 18, 1997

[54] FIBER ROUTING AND RETENTION ASSEMBLY WITH MODULAR FIBER CONNECTOR SUPPORT

[75] Inventor: Tareq K. Hassan, Norcross, Ga.

[73] Assignee: Scientific-Atlanta, Inc., Norcross, Ga.

[21] Appl. No.: 657,417

[22] Filed: Jun. 3, 1996

[51] Int. Cl.⁶ ............................................. G02B 6/36
[52] U.S. Cl. ............................................. 385/135
[58] Field of Search ........................... 385/134, 135, 385/136, 137, 138

[56] References Cited

U.S. PATENT DOCUMENTS

| | | | |
|---|---|---|---|
| 4,792,203 | 12/1988 | Nelson et al. | 385/135 |
| 4,932,774 | 6/1990 | Messelhi | 385/135 |
| 4,961,623 | 10/1990 | Midkiff et al. | 385/135 |
| 5,100,221 | 3/1992 | Carney et al. | 385/135 |
| 5,115,489 | 5/1992 | Norris | 385/135 |
| 5,222,183 | 6/1993 | Daems et al. | 385/135 |
| 5,241,617 | 8/1993 | Peacock et al. | 385/135 |
| 5,247,603 | 9/1993 | Vidacovich et al. | 385/135 |
| 5,285,515 | 2/1994 | Milanowski et al. | 385/135 |
| 5,375,185 | 12/1994 | Hermsen et al. | 385/135 |
| 5,402,515 | 3/1995 | Vidacovich et al. | 385/135 |
| 5,421,532 | 6/1995 | Richter | 385/135 |
| 5,442,726 | 8/1995 | Howard et al. | 385/135 |
| 5,457,763 | 10/1995 | Kerry et al. | 385/135 |

Primary Examiner—John Ngo
Attorney, Agent, or Firm—Banner & Witcoff, Ltd.

[57] ABSTRACT

A fiber routing and retention assembly for routing and mounting at least two fibers having a terminal end within an electronic enclosure. The assembly includes a fiber routing track, a fiber tray, and a pivot arrangement. The fiber routing track includes horizontal and vertical legs, each having a guide channel for guiding and retaining the fibers. The fiber routing track also includes attachment structure, preferably projections, for attaching the fiber routing track to the electronic enclosure. The fiber tray retains and routes the fibers therein, including the terminal ends of the fibers, and has a raceway including inner and outer walls for routing the fibers therebetween. The pivot arrangement is coupled to the fiber routing track and the fiber tray permitting the rotational movement of the fiber tray with respect to the track between a stowed position and an access position.

4 Claims, 6 Drawing Sheets

FIBER ROUTING AND RETENTION ASSEMBLY WITH MODULAR FIBER CONNECTOR SUPPORT

This invention is related by subject matter to U.S. patent application Ser. No. 08/657,205 of Jelinek et al. entitled RECONFIGURABLE NODE FOR A COMMUNICATIONS NETWORK, filed concurrently herewith.

FIELD OF THE INVENTION

This invention is related to an optical fiber routing and retention assembly for optical fibers, and, more particularly, to an optical fiber routing and retention assembly having a pivotally mounted tray and a modular fiber connector support for facilitating the connection between a plurality of optical fibers.

BACKGROUND OF THE INVENTION

Existing fiber routing and retention assemblies are known which provide protection against the breakage of delicate optical fiber cables. It is important in such assemblies to protect against breakage by not exceeding the maximum bend radius of the fiber in routing the fiber therethrough. Assemblies are known from U.S. Pat. Nos. 5,100,221, 5,402,515, and 5,421,532, which secure the fibers in place and permit pivoting of the assembly to provide access. However, none of the known assemblies provide a retention that is sufficiently gentle to the fiber that can be relied on in rough handling and in particular to outdoor environments where housings for the assembly may be susceptible to winds, both low and high temperatures and other adverse environmental conditions. For example, temperature extremes can cause shrinkage and expansion of a retention assembly in relation to the fiber it retains and can cause fiber breakage. Also, through the increased use of optical fiber, there has been recognized in the industry a need to provide reliable modular connectors for fibers. Many different fiber connectors are known; yet, known fiber retention assemblies are not readily adaptable to the support the various connectors. Consequently, there remains a need in the art for a fiber routing and retention assembly that is readily adaptable to support various types of fiber connectors and/or splicing apparatus and, moreover, is capable of routing and retaining optical fiber to and from associated apparatus without breakage in the presence of adverse weather conditions or rough handling.

SUMMARY OF THE INVENTION

In view of the foregoing, it is a principal object of the present invention to provide an improved fiber routing and retention assembly which overcomes the drawbacks of the prior art.

It is another object of the present invention to provide an fiber routing and retention assembly which is highly resistant to extreme environmental conditions, e.g., high and low temperatures and winds, and effectively retains the fibers.

It is yet another object of the present invention to provide an fiber routing and retention assembly which provides enhanced adaptability for receiving a plurality of difference modular connectors and/or splices.

It is yet another object of the present invention to provide an fiber routing and retention assembly which provides a versatile routing track designed to minimize excess slack in the routed fibers.

These and other objects of the present invention are achieved by a fiber routing and retention assembly for muting and mounting at least two fibers having a terminal end within an electronic enclosure. The assembly includes a fiber routing track, a fiber tray, and a pivot arrangement. The fiber routing track includes horizontal and vertical legs, each having a guide channel for guiding and retaining the fibers. The fiber routing track also includes attachment structure, preferably projections, for attaching the fiber routing track to the electronic enclosure. The fiber tray retains and routes the fibers therein, including the terminal ends of the fibers, and has a raceway including inner and outer walls for routing the fibers therebetween. The pivot arrangement is coupled to the fiber routing track and the fiber tray permitting the rotational movement of the fiber tray with respect to the track between a stowed position and an access position.

In another aspect, the present invention provides a fiber routing and retention assembly for routing fibers and mounting fiber connectors. The assembly includes a support, a fiber tray, and a pivoting arrangement coupled to the support and the fiber tray for permitting the rotational movement of the fiber tray with respect to the support between a stowed position and an access position. The fiber tray includes top, bottom, inner and outer walls to retain at least two fibers therein. The inner and outer wall positively limit the minimum and maximum bending radii of the fibers. The fiber tray further includes a pair of intercostal walls and a central fiber connector support. The intercostal walls permit slack adjustment of the fibers, while the central fiber connector support is located inside the inner wall for coupling the terminal ends of the fibers together.

These and other objects and features of the invention will be apparent upon consideration of the following detailed description of preferred embodiments thereof, presented in connection with the following drawings in which like reference numerals identify like elements throughout.

DETAILED DESCRIPTION

Figure 1:
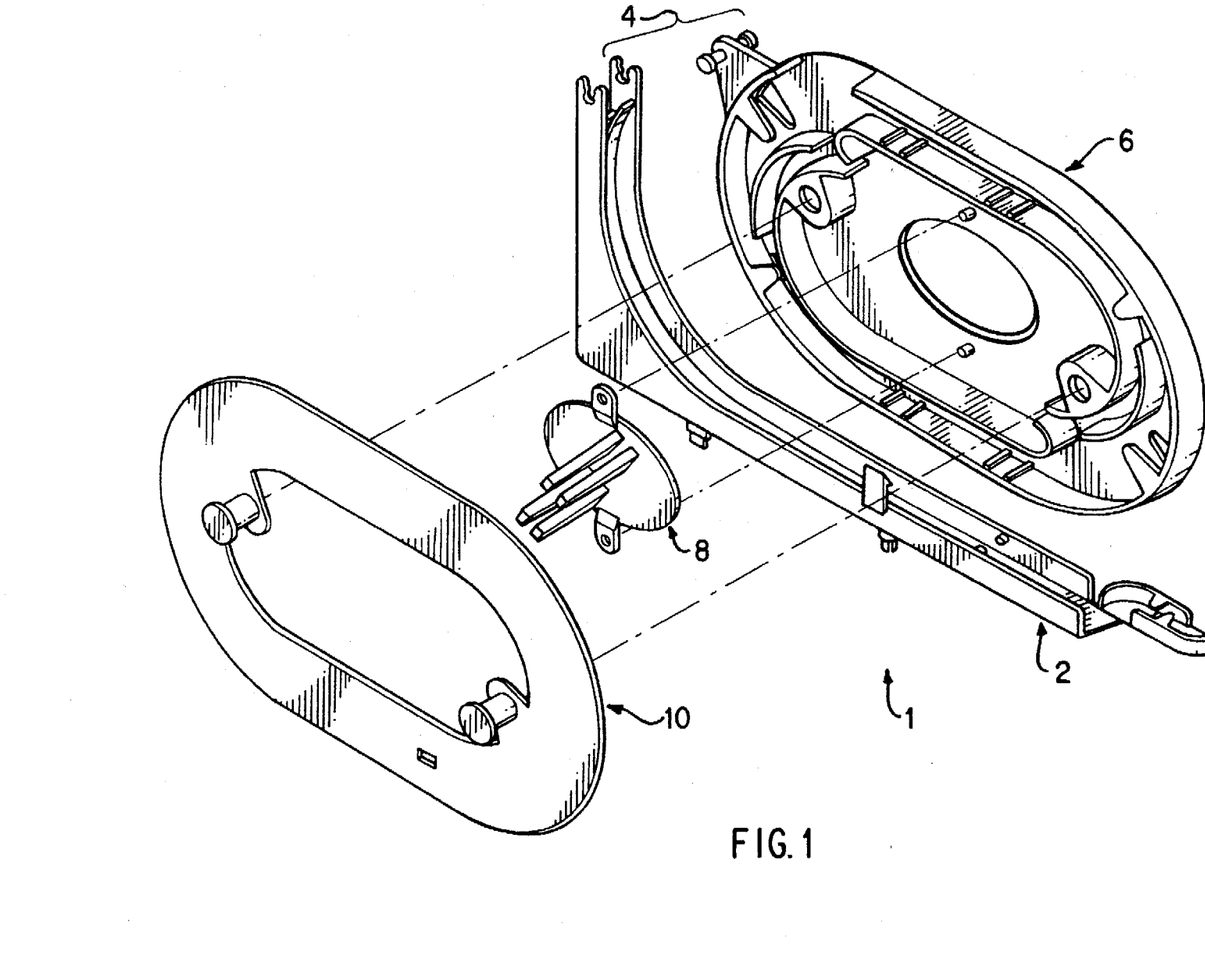
FIG. 1 is an exploded perspective view of the fiber routing and retention assembly with the modular fiber connector support shown in the stowed configuration.
Figure 2:
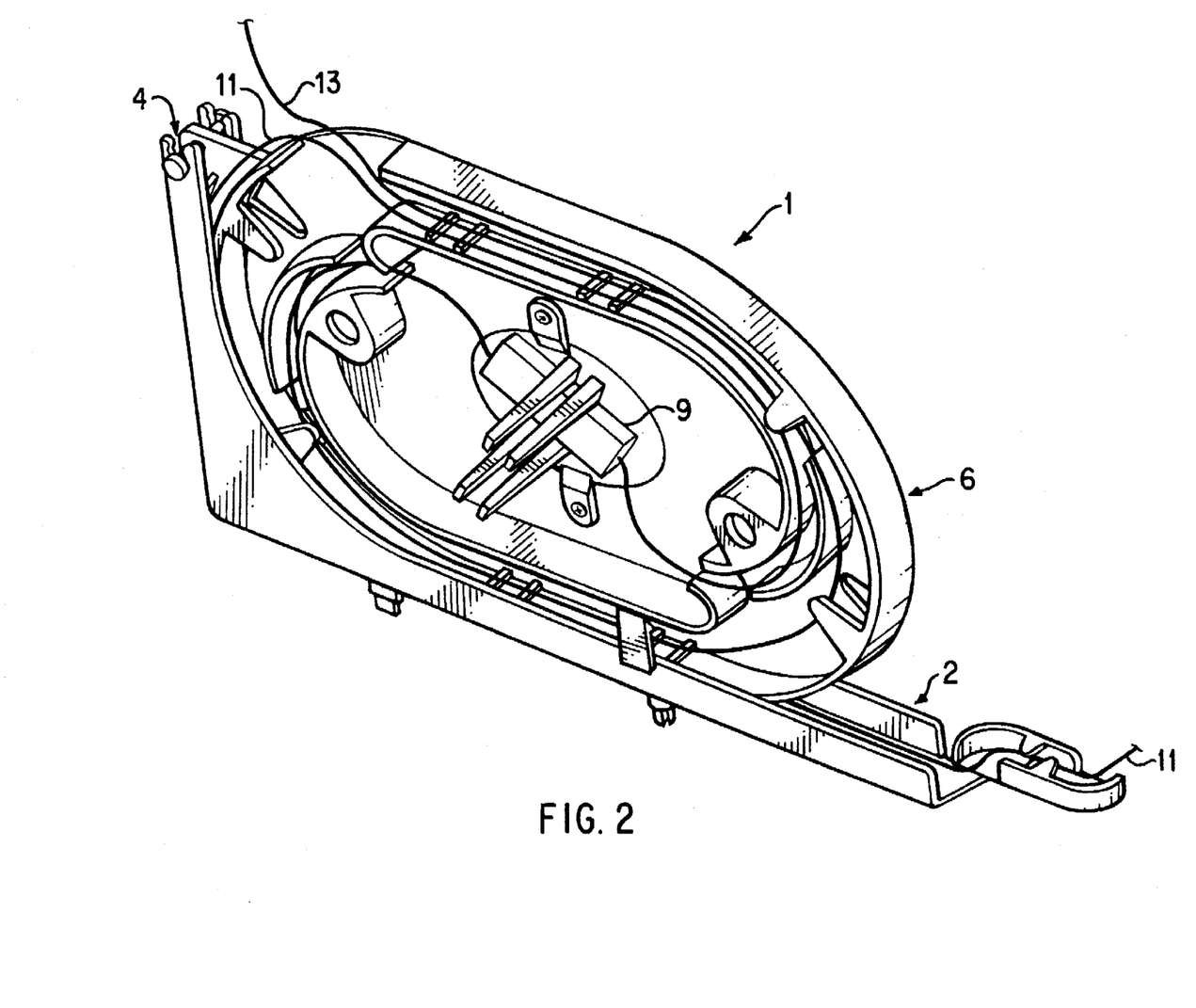
FIG. 2 is a perspective view shown in the stowed or latched configuration.
Figure 3:
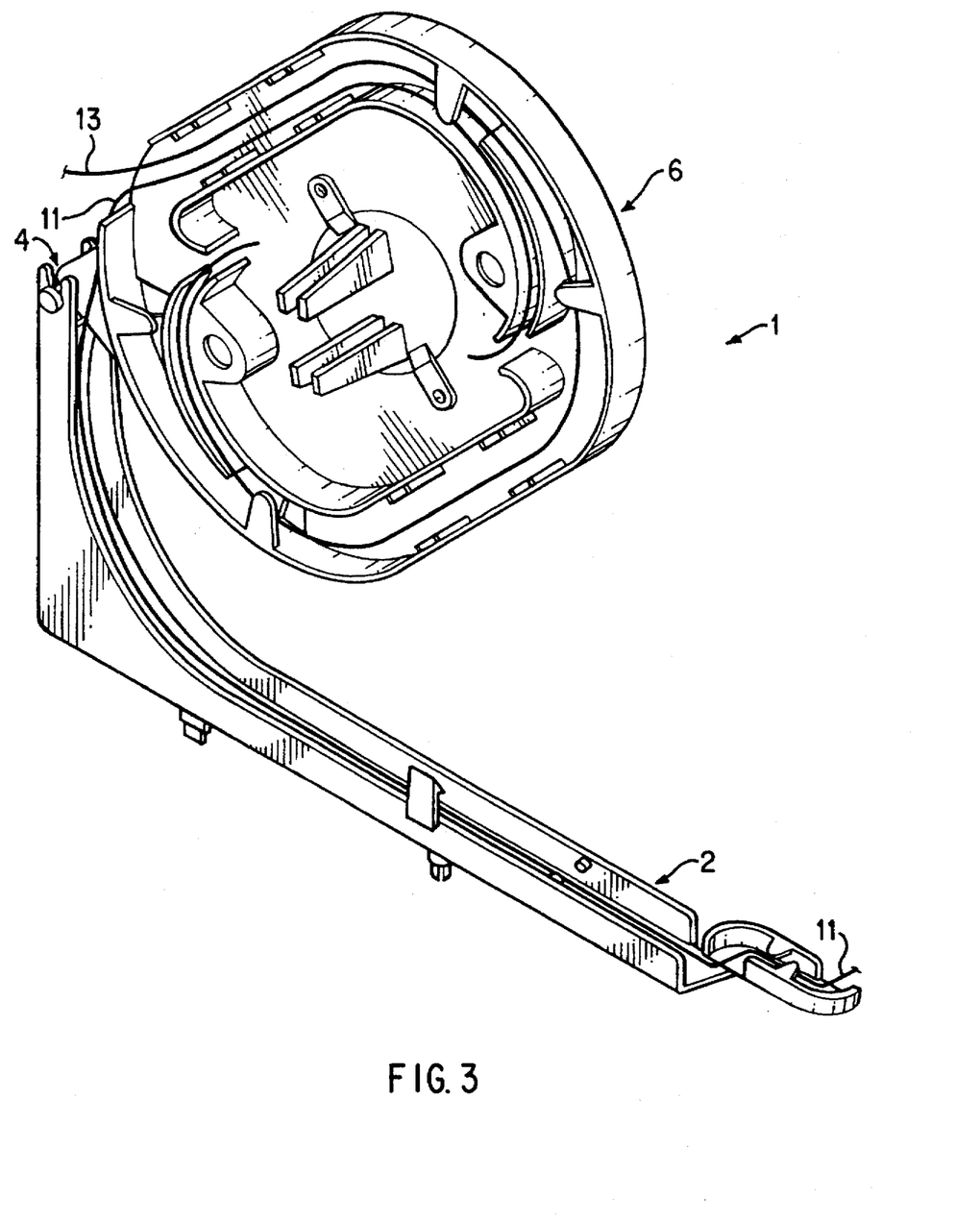
FIG. 3 is a perspective view of the assembly shown in a partially opened configuration with the fiber tray cover removed.

A fiber routing and retention assembly, indicated by reference numeral 1, is shown in FIGS. 1–7, and is of a type which may be used within electronic enclosures. Referring to FIG. 1, fiber routing and retention assembly 1 includes a fiber routing track 2, a pivot arrangement 4, a fiber tray 6, a modular fiber connector support 8, and a fiber tray cover 10. In one preferred embodiment, fiber routing and retention assembly 1 is mounted perpendicularly to a motherboard, not shown, and parallel to an optical receiver/transmitter frame, not shown, within an electronic enclosure. According to U.S. patent application Ser. No. (1263.56286) to Labiche et al, filed concurrently herewith and incorporated herein as to its entire subject matter, the optical receiver/transmitter frame may be manufactured as a plug-in replaceable module. Both the assembly of the present invention and such a module may be adapted to be replaceable in such a plug-in or other manner. Such adaptability, according to the present invention and that disclosed U.S. patent application Ser. No. (1263.56286) to Labiche et al, permits field upgradability, for example, from a cable signal distribution plant from coaxial cable to optical fiber. The fiber routing and retention assembly is preferably removably attached to the motherboard via snap-in elements, and thus can be quickly and easily removed from the electronic enclosure. The fibers and fiber connectors are shown in FIGS. 2–3.

As depicted in FIGS. 1–3, the fiber tray assembly 5, which is composed of the fiber tray 6, modular fiber connector support 8, and fiber tray cover 10 is pivotally movable with respect to the fiber routing track 2. FIG. 2 depicts fiber tray assembly 5 in the closed and latched position, while FIG. 3 depicts fiber tray assembly 5 in a partially pivoted position. In an open or access position, the fibers may be installed, repaired, replaced, inspected or serviced. The closed and latched position is the normal position where the fibers and connectors are generally inaccessible.

Pivot arrangement 4 preferably includes a pivot pin 17 and a pivot sleeve 15 for retaining pivot pin 17 and permitting pivotal movement therebetween. In the figures, pivot pin 17 is depicted being fixedly attached to tray 6 and sleeve 15 is depicted as being fixedly attached to track 2. However, it is recognized that a pivot pin may be attached to track 2 and a sleeve may be attached to tray 6. It is also recognized that other arrangements for providing relative pivotal movement may be used in lieu of a pin and sleeve arrangement to provide the desired pivotal motion.

As is evident from the drawings and the description below, fibers, two of which are shown by reference numerals 11 and 13, are routed into fiber tray 6. One fiber 11 enters the fiber routing track 2 and then proceeds to the tray 6, and the other 13 directly enters the fiber tray 6. A generic fiber connector 9 is shown positioned in the modular fiber connector support 8 and the terminal ends of the two fibers 11 and 13 are preferably coupled to connector 9 to make a connection therebetween.

Figure 4:
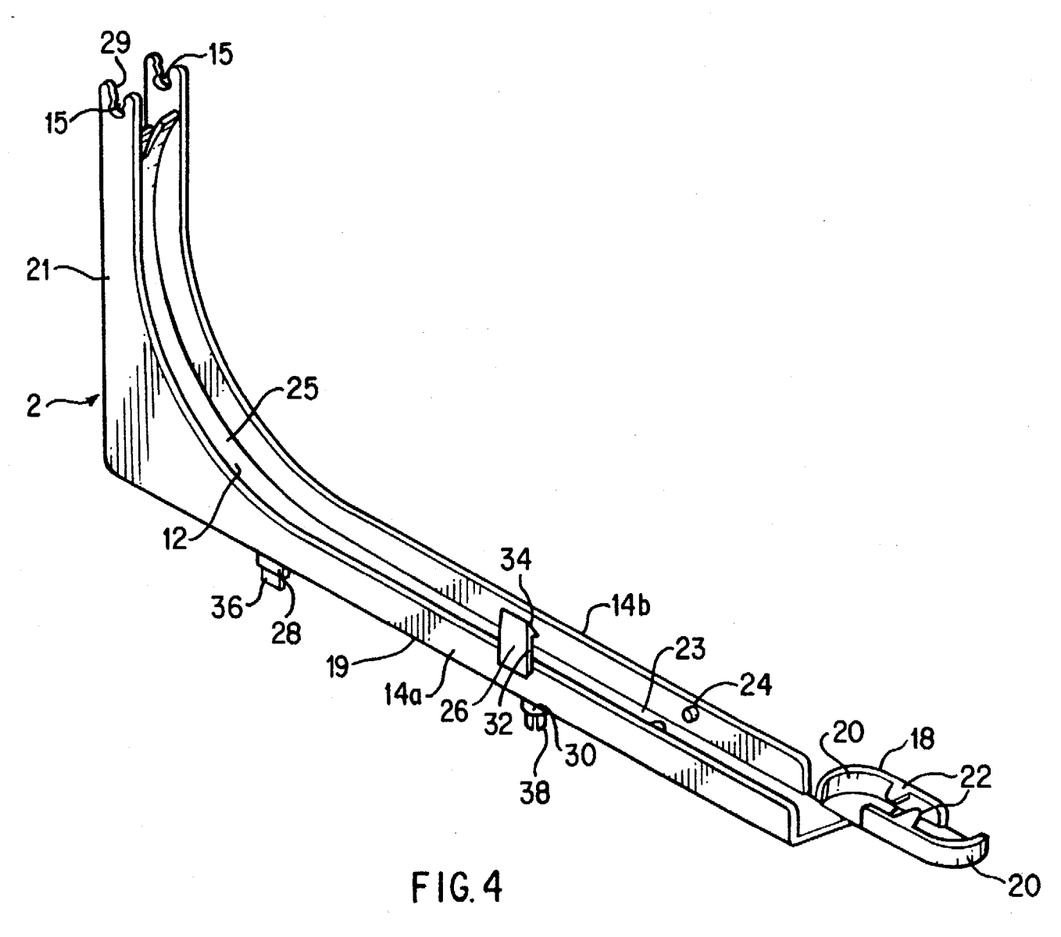
FIG. 4 is a perspective view of the fiber routing track.

FIG. 4 is a perspective view of the fiber routing track 2. Track 2 includes a back wall 12, two side walls 14a, 14b, a fiber entry guide 18, a fiber tray stop 24, a fiber tray latch 26, and mounting elements, at least some of which are preferably of the "snap-in" type.

The fiber routing track has a horizontal leg 19 and a vertical leg 21 and is used to guide the fibers around a corner. It should be noted that the terms horizontal and vertical being used herein are for reference purposes only and the assembly 1 may be mounted in any orientation. Back wall 12 has a flat, straight section 23 along horizontal leg 19 and an arcuate section 25 curving upward to the plane of the vertical leg 21. However, it is noted that back wall 12 need not be curved and may consist of two perpendicular sections extending along each leg. Each side wall 14a, 14b extends along the horizontal and vertical legs 19 and 21, and is integrally and perpendicularly attached to a side edge of the back wall 12 providing a channel within which the fibers travel. Both side walls 14a, 14b have a sleeve 15 and an open clevis 29 at the end of the vertical leg for retention and insertion of pivot pin 4.

A fiber entry guide 18 is shown integrally attached to the end of horizontal leg 19. Fibers enter the fiber entry guide 18 and are guided into the horizontal channel of the track 2. Guide 18 preferably includes curved side walls 20 to guide the entering fiber or fibers into the channel of the horizontal leg 19. The guide is also shown with at least two lugs 22, integrally attached to the top of the fiber entry guide side walls 20 in a direction parallel to the plane of the back wall 12, to vertically retain the fiber entering the track.

The track also includes a fiber tray stop 24 and the fiber tray latch 26. The stop 24 is shown as two peg-like projections extending inward from top of the side walls 14a, 14b near the end of horizontal leg 19. Stop 24 provides a positive limit to rotational travel of the fiber tray 6 around the pivot pin 4, and could be accomplished by a variety of elements. Fiber tray latch 26 is shown integrally formed from the upper side wall 14a and located on the horizontal leg 19. Latch 26 has a flexible finger 32 preferably formed by slotting the side wall 14a on either side of the finger 32. The finger 32 extends beyond the top of the side wall 14a. The top of the latch finger 32 includes a toothed detent 34 with a sloped, upper surface for engaging and disengaging the fiber tray cover 10, as described hereinafter.

In a preferred arrangement, the mounting elements consist of alignment tabs 28 and standoffs 30. While FIG. 4 shows one alignment tab 28 and one standoff 30, in a preferred arrangement, track 2 includes two spaced alignment tabs 28 and three spaced snap-in standoffs 30. Alignment tabs 28 are located near the elbows of the side walls 14a, 14b and extend downward in the planes of the side walls 14a, 14b toward the motherboard, not shown, and having a projecting flexible tab 36 for engaging the motherboard and shoulders on the projecting tab 36 to limit the engagement of track 2 with the motherboard. The standoffs 30 with their snap-in feature 38 project from the lower surface of back wall 12 to engage corresponding holes in the motherboard. Furthermore, the standoffs 30 are spaced such that electronic components, not shown, may be positioned beneath the track 2. Thus, the length of the standoffs 30 may vary and can be designed to optimize the necessary clearance space beneath the track 2 for mounting such electronic components onto the motherboard.

Figure 5:
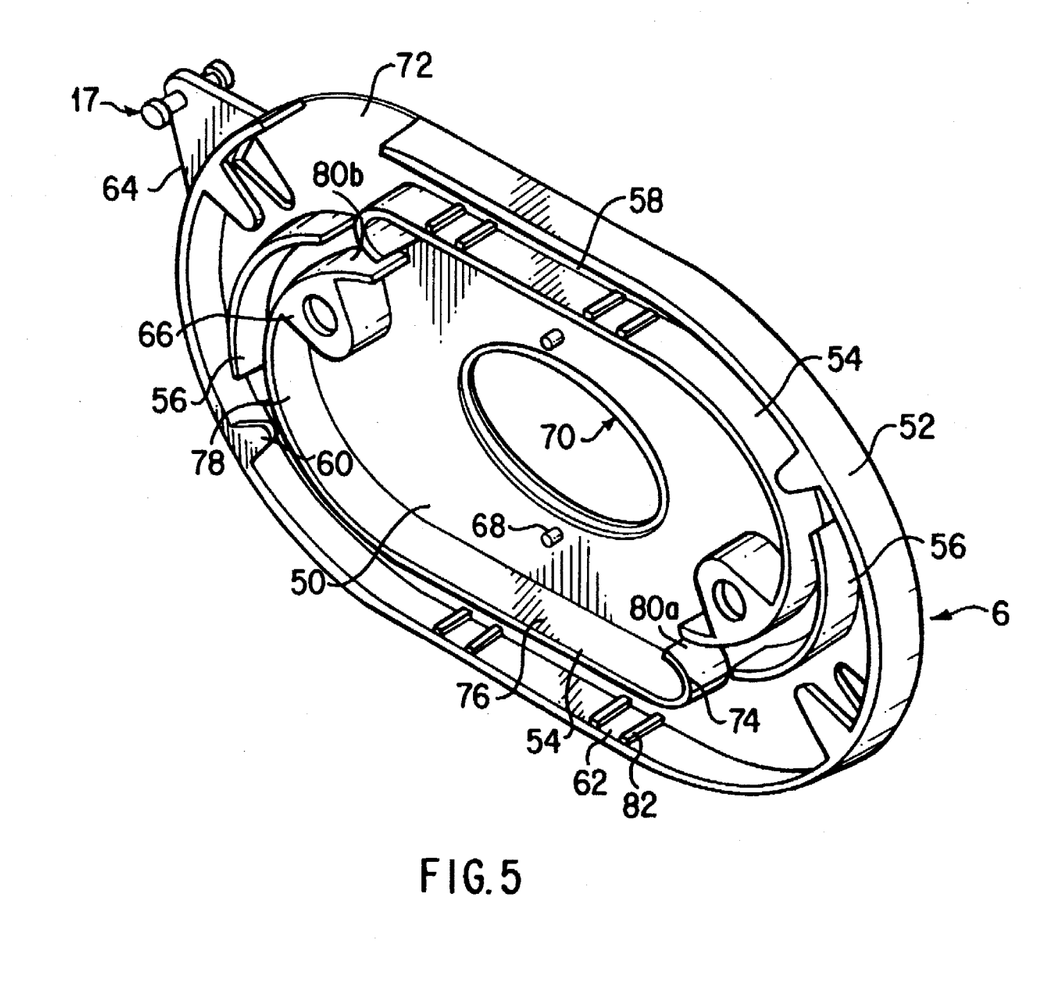
FIG. 5 is a perspective view of the fiber tray.

FIG. 5 is a perspective view of the fiber tray 6. As depicted, the fiber tray 6 preferably comprised of a floor 50, an outer wall 52, an inner wall 54, two intercostal wall sections 56, a fiber raceway or channel 58, at least four fiber retention lugs 60, at least four foam retention channels 62, a pivot flange 64 with beating a pivot pin 17, tray cover mounting flanges 66, and two mounting elements 68 for supporting modular fiber connector support 8.

Fiber tray 6 is generally oval-shaped, i.e., similar to a racecourse, with a central cutout 70 to accommodate the modular fiber connector support base plate. This cutout 70 allows the top surface of the fiber connector support's base plate 100 to be flush with the top surface of the fiber floor 50. Outer wall 52 circumscribes the perimeter of the floor 50. An opening in the outer wall allows fibers to enter. This fiber entry 72 in the outer wall 52 is proximate to the pivot pin 17 and to the terminus of the fiber routing track 2.

Inner wall 54 is formed from two identical inner wall sections. Each inner wall section has (1) an inwardly hook-shaped portion 74 which is contiguous to (2) an inboard offset straight portion 76 which is generally parallel to the straight portion of the outer wall 52 and which is contiguous to (3) a curved portion 78. This curved portion of the inner wall 78 has a smaller radius of curvature than the outer wall 52, and this radius of curvature preferably corresponds to the minimum bend radii of the desired fiber to be routed. Furthermore, the inwardly hook-shaped portion 74 of the first inner wall section is placed proximate to the semicircular portion 78 of the second inner wall section forming a guided fiber entry 80 towards the center of the fiber tray 6.

Between the outer wall 52 and the inner wall 54 a fiber raceway 58 is created. This raceway 58 provides a channel for laying and restraining the fibers. Within the raceway 58 are intercostal wall sections 56 which provide a fiber slack adjustment feature. Intercostal wall sections 56 are composed of short arcuate wall sections placed between the inner wall 54 and outer wall 52 within the semi-circular region of the fiber tray 6. These intercostal wall sections 56 allow the operator to eliminate slack in the fiber by winding long fibers to the outside of the intercostal wall sections 56, while shorter fibers are wound to the inside. Thus, the fibers are never excessively loose inside the fiber tray 6. Furthermore, the radius of curvature of these intercostal wall sections 56 corresponds to the minimum bend radii of the desired fiber to be used. In addition, intercostal wall sections 56 either guide the fiber towards the inner wall's guided fiber entry 80 or, alternatively, guide the fiber along the outside of the inner wall.

FIG. 5 also shows fiber retention lugs 60 attached near the top of the outer wall 52 along the outer wall's semi-circular portion and extending inward toward the inner wall 54. A space between the end of the lug 60 and the inner wall 54 allows the fiber to be deposited and withdrawn from the raceway 58. Furthermore, fiber's may be restrained within the raceway 58 by pieces of foam, not shown. Foam retention channels 62 are composed of opposing pairs of tracks 82 oriented perpendicular to the fiber tray's floor 50 and being integrally attached to the inner surface of the outer wall 52 and the outer surface of the inner walls 54. These channels 62 provide an open slot for retaining a piece of foam, which in turn, further stabilizes the fibers within the raceway 58.

FIG. 5 further depicts the fiber tray's pivot flange 64 with pivot pin 17. The pivot flange 64 extends triangularly outward from the outer wall 52 in the plane of floor 50 and proximate to the outer wall's fiber entry 72. The pivot pin 17 is oriented perpendicularly to the fiber tray 6 adjacent the apex of triangular pivot flange 64. As shown in FIGS. 1–3, pivot pin 17 is then attached to side walls 14a, 14b of track 2 by positioning the pivot pin 17 within the prongs of the side wall's open clevis 29 and into sleeve 15.

Tray cover mounting flanges 66, which are integrally attached to the inward surface of the inner walls 54, provide an engagement hole for the tray cover snap fasteners 110. Furthermore, modular fiber connector support mounting elements or prongs 68 are shown located at the center of the fiber tray 6 within the inner walls 54. Flexible mounting prongs 68 are insertable into corresponding mounting holes on the removable and replaceable fiber connector support 8.

Figure 6:
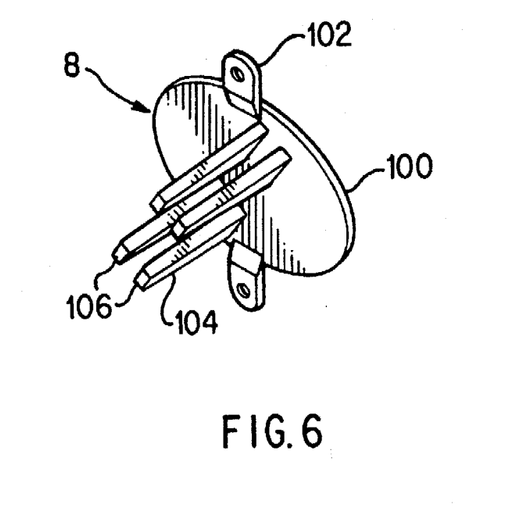
FIG. 6 is a perspective view of the modular fiber connector support.

FIG. 6, shows a detail of a modular fiber connector support 8. This fiber connector support 8 consists of a base plate 100, at least two fiber tray mounting tabs 102 with holes, and a fiber connector retainer 104. In a preferred embodiment, as shown, support 8 can accomodate different fiber connectors, at least three such fiber connectors 9 stacked one on top of another, or even splicing arrangements. Different designs of modular fiber connector support 8 can be used to accomodate future fiber connector 9 configurations. Thus, switching fiber connectors 9 will not force a redesign of the entire fiber routing and retention assembly 1. The size and shape of base plate 100 correspond to the base plate cutout 70 of fiber tray, as the base plate 100 sits down within the base plate cutout 70. Mounting tabs 102 extend from and in the plane of the base plate 100. These mounting tabs 102 have holes 103 for the insertion of, and retention by, support mounting elements 68. Furthermore, as shown in FIG. 2, the fiber connector retainer 104 orients the fiber connector's fiber axis from one inner wall guided fiber entry 80a to the other inner wall guided fiber entry 80b. One preferred configuration of the retainer, as shown in FIG. 6, consists of two pairs of opposing towers 106 wherein the body of the fiber connector 9 slides vertically between the pairs of opposing towers 106 and tabs, not shown, of the fiber connectors 9, are retained between the towers 106 of each pair.

Figure 7:
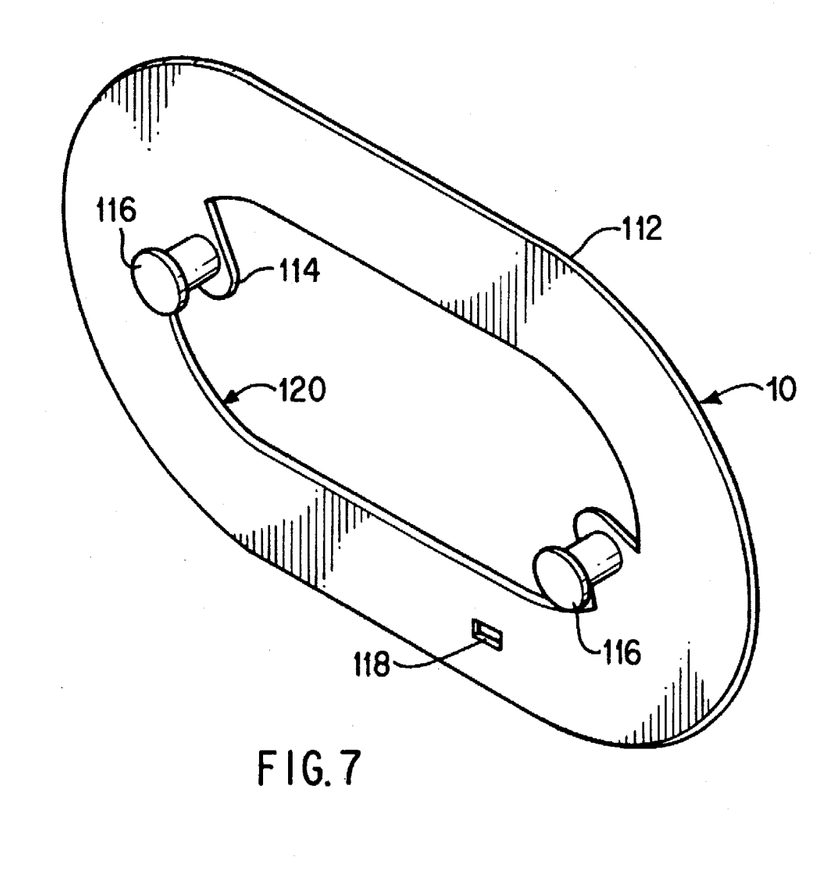
FIG. 7 is a perspective view of the fiber tray cover.

FIG. 7 illustrates fiber tray cover 10. The cover 10 has a flat lid 112, at least two fiber tray mounting flanges 114, fasteners 116, a fiber tray latch catch 118, and a center cutout 120. The lid 112 is shaped to enclose the fiber tray's raceway 58 from outer wall 52 to inner wall 54, thereby assisting in the retention of fibers placed within the raceway 58. The mounting flanges 114 abut with the tray cover mounting flanges 66 of fiber tray 6 and have a retained set of fasteners 116. These fasteners 116 are preferably "snap fasteners", i.e., they snap in and out of the fiber tray's tray cover mounting flange holes 66 to facilitate the removal and attachment of cover 10. The central cutout 120 provides enhanced access to modular fiber connector support 8 and any fiber connectors 9 and/or splices. Latch catch 118 is shown as a rectangular cutout for accepting the toothed detent 34 of the fiber tray latch 26 on the fiber routing track 2 selectively retaining fiber tray assembly 5 in the closed position and disengaging the fiber tray assembly 5 to allow it to pivot to the open position. It is recognized that this latching arrangement could be obtained by reversing the elements, i.e., positioning a latch on cover 10 and a catch on track 2.

In a preferred embodiment, the elements of assembly 1 are a polycarbonate ABS material to withstand extreme environmental conditions, e.g., temperature. One such material is "Pulse 1745" by DOW Chemical. However, it is recognized that various plastics may also be used depending upon the desired environmental conditions.

While particular embodiments of the invention have been shown and described, it is recognized that various modifications thereof will occur to those skilled in the art. For example, it is recognized that the present invention is also applicable to coaxial and possibly other types of cables as well as optical cables. Therefore, the scope of the herein-described invention shall be limited solely by the claims appended hereto.

What is claimed is:

1. A fiber routing and retention assembly for routing and mounting at least two fibers having a terminal end within an electronic enclosure, said assembly comprising:

a fiber routing track, said fiber routing track including horizontal and vertical legs, each leg having a guide channel for guiding and retaining the fibers, said fiber routing track further including attachment structure for attaching said fiber routing track to the electronic enclosure;

a fiber tray, said fiber tray retaining and routing the fibers therein, including the terminal ends of the fibers, said fiber tray having a raceway including inner and outer walls for routing the fibers therebetween; and pivot means coupled to said fiber routing track and said fiber tray for permitting the rotational movement of said fiber tray with respect to said track between a stowed position and an access position.

2. The fiber routing and retention assembly according to claim 1 wherein said fiber tray further having a removable central support with a fiber connector mounting member for facilitating the removable mounting of at least one fiber connector with respect to the central support to join the terminal ends of said two fibers together.

3. The fiber routing and retention assembly according to claim 1 wherein said attachment structure includes flexible plastic projections capable of functioning as standoffs.

4. The fiber routing and retention assembly according to claim 1 wherein said fiber tray includes a body and a tray cover removably coupled to said body to protect and retain the fibers when said fiber tray is in both said stowed and access positions.

* * * * *